(12) United States Patent
Zhang et al.

(10) Patent No.: US 6,179,432 B1
(45) Date of Patent: Jan. 30, 2001

(54) LIGHTING SYSTEM FOR A KEYBOARD

(75) Inventors: Tim L. Zhang, Spring; Jeffrey K. Jeansonne, Houston, both of TX (US)

(73) Assignee: Compaq Computer Corporation, Houston, TX (US)

( * ) Notice: Under 35 U.S.C. 154(b), the term of this patent shall be extended for 0 days.

(21) Appl. No.: 09/229,246

(22) Filed: Jan. 12, 1999

(51) Int. Cl.$^7$ ........................................................ F21V 9/16
(52) U.S. Cl. ............................................ 362/84; 362/85
(58) Field of Search ............................... 362/84, 85, 109, 362/253; 345/170

(56) References Cited

U.S. PATENT DOCUMENTS 5,899,553 * 5/1999 Howell ..................................... 362/84
5,971,557 * 10/1999 Kubes et al. ........................ 362/84 X

* cited by examiner

*Primary Examiner*—Stephen Husar
(74) *Attorney, Agent, or Firm*—Sharp, Comfort & Merrett, P.C.

(57) ABSTRACT

An illuminated keyboard that may be used for providing inputs to a computer. The keyboard includes a keyboard base pan and a plurality of input keys having keycaps that may be pressed by a user. An electroluminescent lamp, in the form a flat panel, is sandwiched between the keyboard base pan and the keycaps to illuminate the keyboard during use.

14 Claims, 3 Drawing Sheets

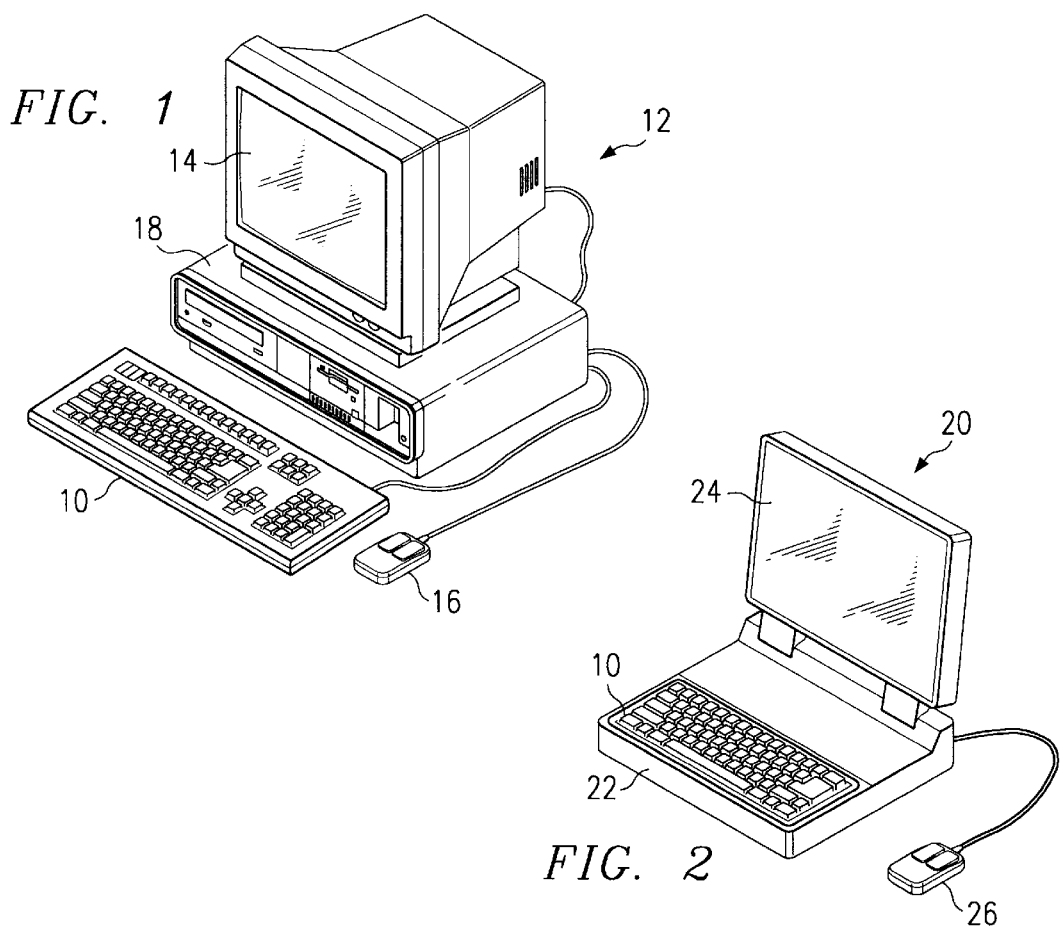
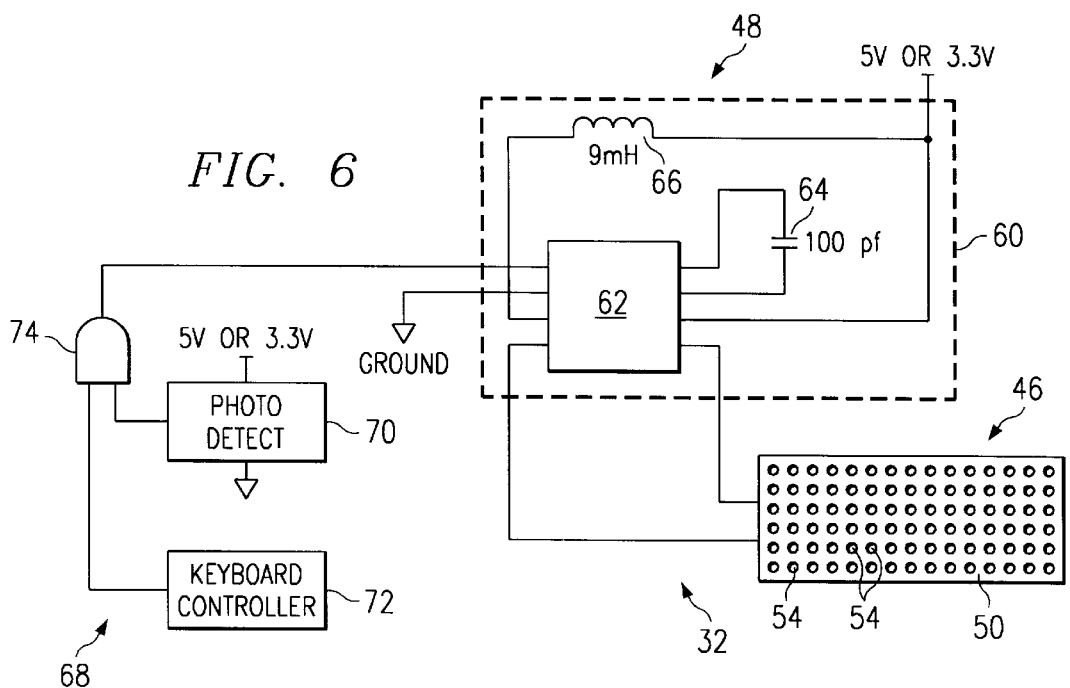

LIGHTING SYSTEM FOR A KEYBOARD

FIELD OF THE INVENTION

The present invention relates generally to keyboards, such as those used in conjunction with computers, and particularly to a keyboard having a self-illumination system.

BACKGROUND OF THE INVENTION

Keyboards are used with a variety of devices to provide selective inputs. For example, computers, such as desktop or laptop computers utilize keyboards as an interface with a user. A typical keyboard includes a plurality of keys, each having an upper strike surface that can be pressed to provide desired inputs to the computer. Typically, the keys includes alphanumeric symbols or other symbols to guide the user as to which key or keys should be pressed to provide a desired input to the computer.

Conventional keyboards can be problematic when working in low light or no light conditions. The computer display panel, e.g. monitor, is illuminated and readily visible. However, conventional keyboards are not illuminated and, hence, the symbols displayed on individual keys are not readily visible to the user. This can create difficulty in utilization of the keyboard to provide appropriate input to the computer or other device.

It would be advantageous to have a self-illumination system for a keyboard to assist a user in low ambient light conditions.

SUMMARY OF THE INVENTION

The present invention features a system for illuminating a keyboard having a keyboard base pan, a plurality of key actuators and a plurality of keycaps. The keyboard is of the type used with a personal computer. The system comprises an illumination panel having a thickness that permits placement of the illumination panel between the keyboard base pan and the plurality of keycaps. The illumination panel includes a plurality of openings for receiving the key actuators therethrough. The illumination panel may be illuminated selectively to provide a user with a lighted keyboard.

According to another aspect, the invention features a keyboard for use in providing inputs to a computer. The keyboard includes a base pan and a plurality of input keys. The input keys extend from the keyboard base pan, and each input key includes an upper strike surface that selectively may be pressed by a user. Additionally, the keyboard includes a lamp disposed along the keyboard base pan such that it does not extend above the upper strike surfaces.

According to a further aspect of the invention, a method is provided for illuminating a keyboard of the type designed for use with a digital device. The method includes providing a keyboard base structure on which a plurality of input keys may be mounted. The method further includes mounting a lamp adjacent the keyboard base structure. Furthermore, the plurality of input keys are oriented so a strike surface of each input key is disposed outwardly from the lamp and the keyboard base structure. In a preferred embodiment, the lamp comprises an electroluminescent lamp in the shape of a flat panel having a plurality of openings corresponding to the plurality of input keys.

BRIEF DESCRIPTION OF THE DRAWINGS

The invention will hereafter be described with reference to the accompanying drawings, wherein like references numerals denote like elements, and:

FIG. 1 is a perspective view of an exemplary desktop computer system that may be combined with a keyboard, according to a preferred embodiment of the present invention;

FIG. 2 is a perspective view of another exemplary computer system that may be used in conjunction with a keyboard, according to a preferred embodiment of the present invention;

FIG. 6 is a circuit diagram illustrating an exemplary circuit for powering the keyboard lamp.

DETAILED DESCRIPTION OF SPECIFIC EMBODIMENTS

Figure 3:
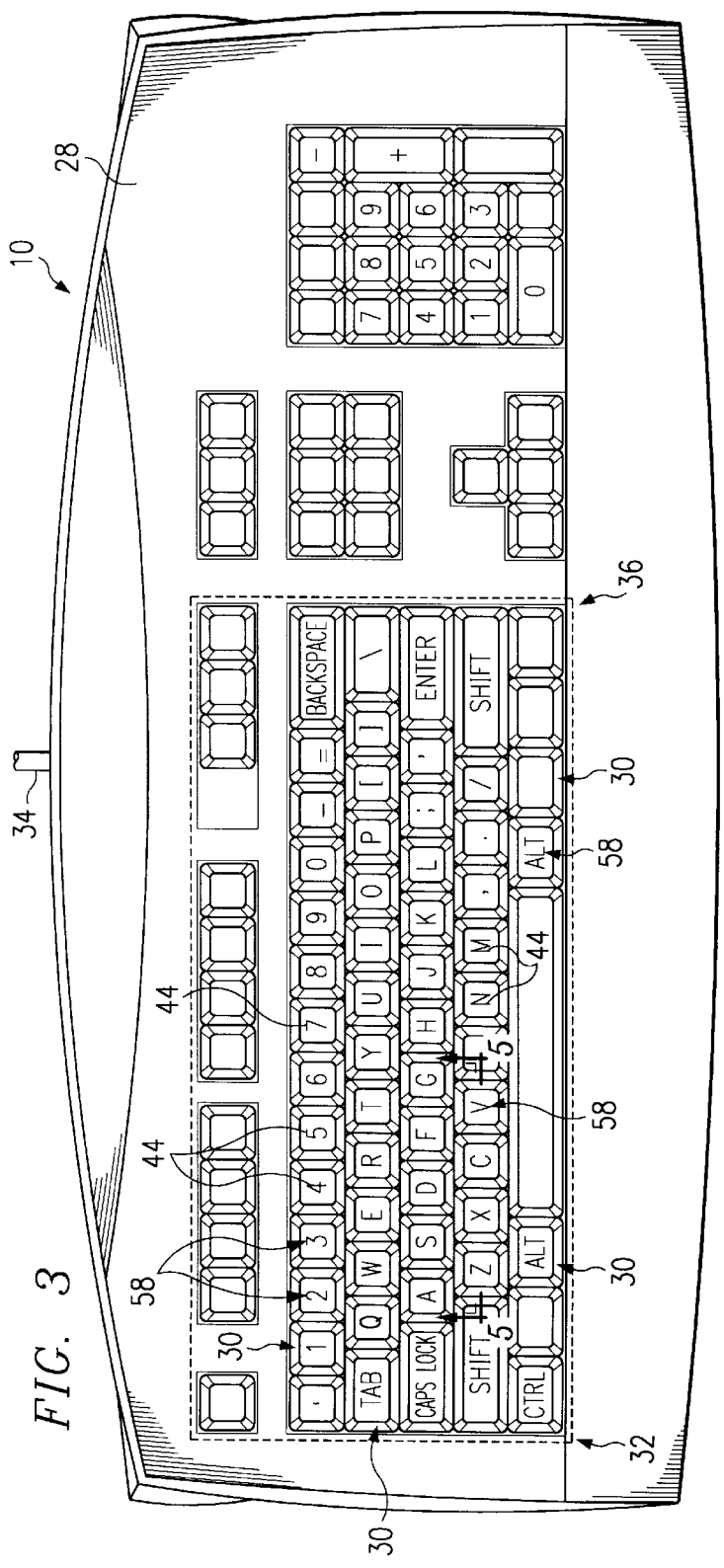
FIG. 3 is a perspective view of a keyboard, according to a preferred embodiment of the present invention.

Referring generally to FIG. 1, an exemplary embodiment of a keyboard 10, according to a preferred embodiment of the present invention, is illustrated as incorporated into a device 12. Typically, device 12 is a digital device, such as a computer. Keyboard 10 is utilized as an interface for providing inputs to device 12.

In the exemplary embodiment illustrated in FIG. 1, device 12 is a desktop-style personal computer having a monitor or display 14, keyboard 10 and a mouse 16 that provides another system for permitting a user to interact with device 12. Keyboard 10, display 14 and mouse 16 are connected to a central computer module 18, that typically houses, for instance, a hard drive and microprocessor. The particular style and features available on device 12 vary widely, but keyboard 10 can be adapted for any of these configurations.

For example, another digital device that utilizes a keyboard 10 is a laptop-style personal computer 20, as illustrated in FIG. 2. In a typical laptop computer, keyboard 10 is integrated into the outer housing 22. As with the desktop computer illustrated in FIG. 1, a wide variety of laptop computers 20 are available. Generally, such computers feature at least a display 24 and a mouse 26.

The devices illustrated in FIGS. 1 and 2 are two of many examples of devices that utilize keyboards for providing inputs. With any of these devices, and particularly with personal computers, the lack of illumination proximate keyboard 10 can be problematic in low ambient light or no ambient light conditions. The light from the device's display, such as display 14 or display 24, may be the only light by which a user may determine which input keys to press on keyboard 10. This can be a particular problem when the keyboard is maintained at a substantial distance from the display.

Figure 5:
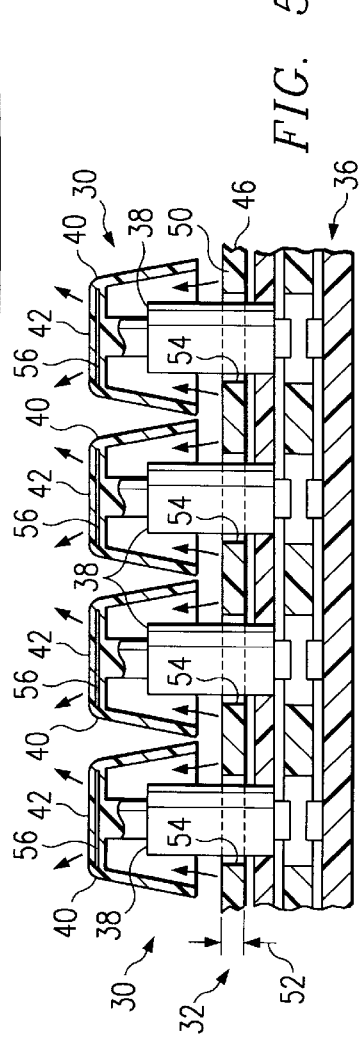
FIG. 5 is a cross-sectional view taken generally along line 5—5 of FIG. 3.
Figure 4:
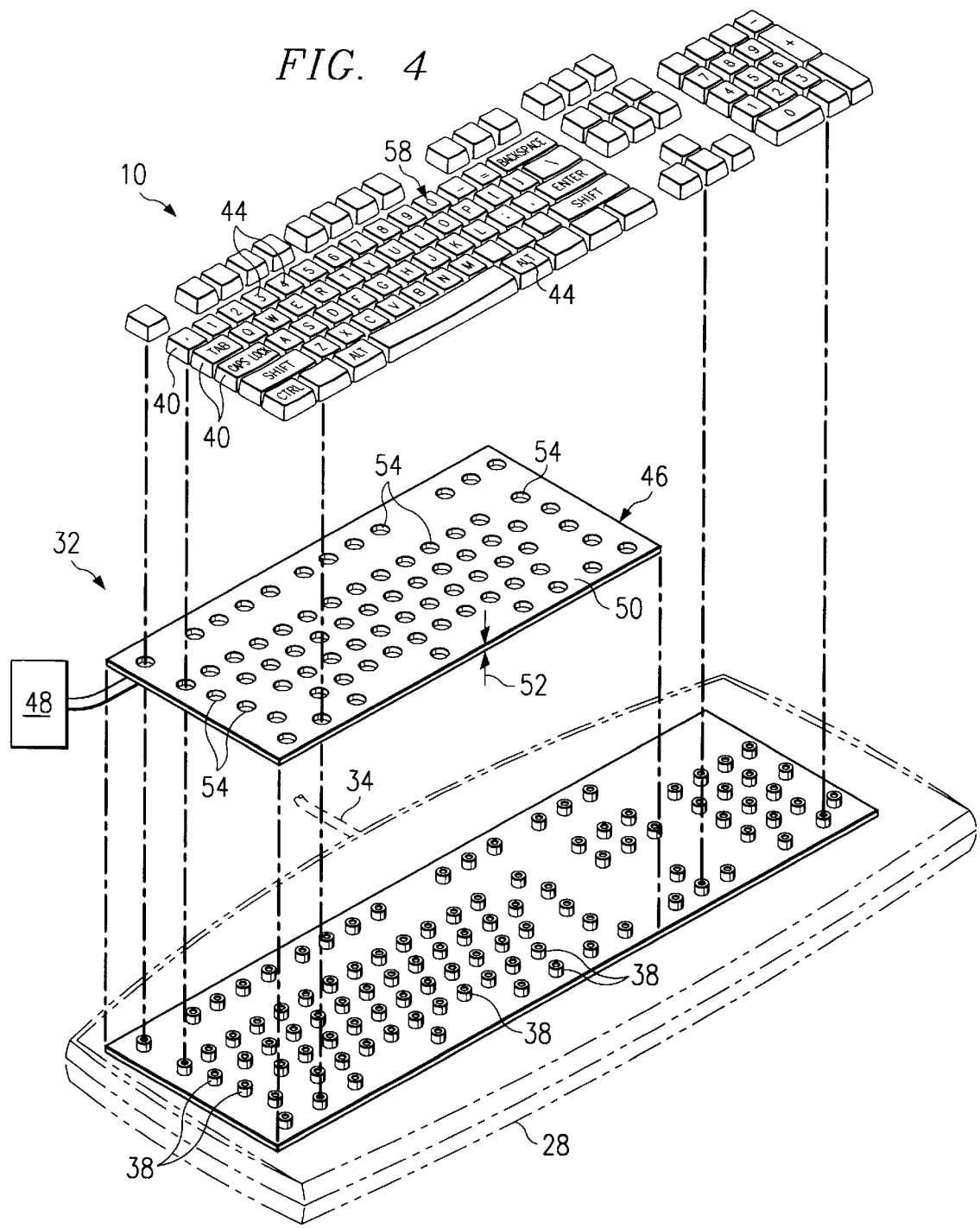
FIG. 4 is an exploded view of the keyboard illustrated in FIG. 3.

Referring generally to FIGS. 3–5, keyboard 10 is illustrated according to a preferred embodiment of the present invention. Keyboard 10 includes an outer housing 28, a plurality of input keys 30, an illumination system 32 and a communication link 34. Communication link 34 may be in the form of direct hardwiring, as with the laptop computer 20, an independent cord that may be plugged into computer module 18 of device 12, an RF communication link or a variety of other communication links.

Outer housing 28 includes a keyboard base pan 36 from which the plurality of input keys 30 extend. The input keys 30 may be arranged in a variety of patterns along keyboard base pan 36. However, they typically are arranged in conventional patterns of alphanumeric and other symbols, as found with most personal computers, to guide the user in providing appropriate input via keyboard 10.

Each input key 30 preferably includes a key actuator 38 mounted to keyboard base pan 36, and a keycap 40 mounted to a corresponding key actuator 38, as is known to those of ordinary skill in the art. Each keycap 40 preferably includes an upper strike surface 42 disposed for contact by the fingertips of a user providing input to an appropriate device 12. Typically, one or more alphanumeric or other symbols 44 is visible at a corresponding strike surface 42 to guide the user in pressing appropriate input keys 30. The key actuators 38 cooperate with appropriate output circuitry, as is well known to those of ordinary skill in the art, to provide corresponding output signals to device 12, 20 via communication link 34. The output signals correspond to the particular input key or keys 30 pressed by the user.

Illumination system 32 comprises a lamp 46 powered by appropriate power supply circuitry 48. Preferably, lamp 46 is an electroluminescent lamp disposed along keyboard base pan 36 to illuminate at least portions of keyboard 10. To prevent interference with actuation of input keys 30, it is preferred that lamp 46 be disposed at a position below strike surfaces 42 of input keys 30, i.e. at a position towards keyboard base pan 36 from strike surfaces 42. This orientation ensures that strike surfaces 42 are disposed outwardly from both the lamp 46 and keyboard base pan 36 to avoid any interference during use.

In the most preferred embodiment, lamp 46 is an electroluminescent lamp flat panel 50 having a thickness 52 that permits it to be sandwiched between keyboard base pan 36 and keycaps 40, as best illustrated in FIG. 5. The preferred thickness 52 is in the range from approximately 0.1 mm to 1 mm, and most preferably approximately 0.25 mm. Additionally, the preferred flat panel 50 includes a plurality of openings 54 through which key actuators 38 extend. Thus, lamp panel 50 is securely and unobtrusively captured between keyboard base pan 36 and keycaps 40, typically throughout a substantial portion of keyboard base pan 36.

To facilitate illumination of keyboard 10, and specifically input keys 30, it is preferred that at least part of each keycap 40 comprises a light transfer portion 56 to permit passage of light therethrough from lamp 46. For example, light transfer portion 56 may comprise a translucent plastic disposed through the keycap. The symbols 44, e.g. characters or icons, can be formed in each keycap by the translucent material to create a plurality of light transmitting symbols 58. Another potential arrangement includes placement of opaque symbols 44 in keycaps formed of a translucent material to allow transmission of light around the characters or icons. Furthermore, the use of lamp flat panel 50 provides illumination around the edges of keycaps 40 to further differentiate individual keycaps from the next adjacent keycaps.

A variety of electroluminescent lamp panels 50 and power supply circuits 48 may be used to illuminate keyboard 10. An exemplary lamp and circuit, however, is illustrated in FIG. 6.

In the illustrated embodiment, an electroluminescent lamp, such as the Novalite™ lamp, available from ELtech of Austin, Tex., a subsidiary of Gunze Ltd. of Japan, is coupled to a power inverter circuit 60 for driving electroluminescent lamp panel 50. An exemplary power inverter circuit 60 is a charge pump power inverter implemented by a charge pump power inverter device 62, such as a Sipex 4422A, available from Sipex of Billerica, Mass. coupled with appropriate resonant elements, such as a capacitor 64 and an inductor 66, as illustrated.

Power inverter circuit 60 controls the voltage and frequency output to electroluminescent lamp flat panel 50. Typically, power inverter circuit 60 converts a standard 3.3V or 5.0V voltage to a higher voltage, in the range from approximately 50–300 volts peak-to-peak, at a relatively high frequency, in the range from approximately 50–1000 HZ, to drive electroluminescent lamp 50. Tuning of the magnitude of the voltage and frequency can be accomplished by selecting appropriate values for inductor 66 and capacitor 64.

In the exemplary, illustrated embodiment, inductor 66 is a 9 mH inductor and capacitor 64 is a 100 pf capacitor. The optional values will vary, however, depending on the selection of lamp 46. Also, the brightness of flat panel 50 can be controlled by controlling the voltage and frequency, which, in turn, can be controlled by selecting inductors 66 and capacitors 64 having appropriate parameters.

Preferably, a switching circuit 68 also is coupled to power inverter circuit 60, as illustrated. An exemplary switching circuit 68 includes a photo detector 70 and a keyboard controller 72. Photo detector 70 preferably is designed to output a logic high during low ambient light conditions. Similarly, keyboard controller 72 is designed to output a logic high at a given input. For example, keyboard controller 72 may be coupled to keyboard 10, such that when an input key 30 is pressed, a logic high is output. Additionally, an appropriate timing circuit may be incorporated into keyboard controller such that the logic high is de-asserted following a given time period, e.g. 10 seconds, after pressing one of the input keys 30.

Photo detector 70 and keyboard controller 72 both are connected to an AND gate 74. On input of a logic high from photo detector 70 and keyboard controller 72, AND gate 74 outputs a logic high to device 60 which, in turn, applies the appropriate voltage to electroluminescent lamp 50 to illuminate keyboard 10. Thus, the keyboard 10 is illuminated only when the ambient light is sufficiently low and keyboard controller 72 has been activated, e.g. when an input key 30 has been pressed. This permits electroluminescent lamp 50 to be in an activated or unactivated state while the corresponding computer or other device is powered. It also should be noted that power supply 48 may be configured in a variety of ways, depending on the desired activation, type of lamp 46 and system voltages.

It will be understood that the foregoing description is of a preferred embodiment of this invention, and that the invention is not limited to the specific form shown. For example, the inventive keyboard may be used to provide input to a variety of digital devices; a variety of lamp configurations may be used; the power supply circuitry may be adjusted according to the particular operating parameters of the keyboard or device; the power supply circuitry can be located on the keyboard or at a remote location such as at another location in the digital device. These and other modifications may be made in the design and arrangement of the elements without departing from the scope of the invention as expressed in the appended claims.

What is claimed is:

1. A keyboard suitable for use in providing inputs to a computer, comprising:

a keyboard base pan;

a plurality of input keys extending from the keyboard base pan, each input key having a hollow keycap including an upper strike surface; and an illumination panel having openings above which the keycaps extend, said illumination panel disposed between the keycaps and the keyboard base pan to illuminate the plurality of input keys, each said keycap incorporating a symbol defined by a light transmitting portion at said strike surface.

2. The keyboard as recited in claim 1, wherein the illumination panel comprises an electroluminescent panel.

3. The keyboard as recited in claim 1, further comprising a power source configured to provide an output signal to the lamp.

4. The keyboard as recited in claim 3, wherein the output signal is at a voltage in the range from approximately 50–300 volts peak-to-peak.

5. The keyboard as recited in claim 4, wherein the output signal has a frequency in the range from approximately 50–1000 hertz.

6. The keyboard as recited in claim 1, wherein each input key includes an actuator to which the keycap of that input key is attached, said actuator passing through one of said openings in the illumination panel.

7. The keyboard as recited in claim 1, wherein said symbols include alphanumeric symbols.

8. A keyboard suitable for use in providing inputs to a computer, comprising:

a keyboard base pan;

a plurality of input keys extending from the keyboard base pan;

a lamp disposed to illuminate the plurality of input keys;

a power supply connected to said lamp for energization thereof; and logic circuitry responsive to activation of a said input key concurrently with ambient light below a threshold level to enable said power supply to energize said lamp.

9. The keyboard as recited in claim 8, wherein the power signal is provided to the illumination panel at an a.c. voltage in the range from approximately 50–300 volts peak-to-peak.

10. The keyboard as recited in claim 9, wherein the power signal has a frequency in the range from approximately 50–1000 hertz.

11. The keyboard as recited in claim 8 wherein said logic circuit comprises a logic gate having a first input coupled to receive logic signal representing actuation of a said input key and a second input coupled to receive logic signal output from a photo detector responsive to ambient light level.

12. A keyboard for use in providing inputs to a computer, comprising:

a keyboard base pan;

a plurality of input keys extending from the keyboard base pan, each input key having an actuator attached to an inverted cup shaped keycap having an upper strike surface; and a lamp panel having openings therein through which said actuators pass, said lamp panel disposed between said keyboard base pan and said keycaps to illuminate the plurality of input keys;

each said keycap including at least one light transmitting symbol at said strike surface, said symbol defined by a light transmissive portion at said strike surface.

13. A keyboard for use in providing inputs to a computer, comprising:

a keyboard base pan;

a plurality of input keys extending from the keyboard base pan, each input key having an actuator attached to an inverted cup shaped keycap including an upper strike surface, and actuator depending from said strike surface; and a lamp panel having openings therein through which said actuators pass, said lamp panel disposed between said keyboard base pan and said keycaps to illuminate the plurality of input keys;

each said keycap incorporating a light transmissive portion defining at least one light transmitting symbol at said strike surface; and logic circuitry comprising a logic gate having a first input for connection to receive a logic signal input representing activation of a said input key and a second input connected to receive logic signal input from a photo detector when ambient light is below a threshold value, to enable said power supply to energize said lamp panel in response to activation of a said input key when ambient light is below said threshold value.

14. The keyboard as recited in claim 13, wherein said logic circuit comprises a logic gate having a first input responsive to a logic signal representing actuation of a said input key and a second input responsive to a logic signal output from a photo detector.

\* \* \* \* \*